(12) United States Patent
Shah et al.

(10) Patent No.: US 8,745,250 B2
(45) Date of Patent: Jun. 3, 2014

(54) MULTIMODAL PROXIMITY DETECTION

(75) Inventors: Rahul C. Shah, San Francisco, CA (US); Jonathan J. Huang, Sunnyvale, CA (US); Giuseppe Raffa, Portland, OR (US); Lama Nachman, Santa Clara, CA (US); Jinwon Lee, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/459,296

(22) Filed: Jun. 30, 2009

(65) Prior Publication Data

US 2010/0332668 A1 Dec. 30, 2010

(51) Int. Cl.
*G06F 15/16* (2006.01)
*H04W 24/00* (2009.01)

(52) U.S. Cl.
USPC .................. 709/229; 709/218; 455/456.3

(58) Field of Classification Search
USPC ......... 709/201–203, 217–219, 224, 229–231; 455/418, 456.3, 552, 552.1, 556, 566
See application file for complete search history.

(56) References Cited

U.S. PATENT DOCUMENTS

| | | | | |
|---|---|---|---|---|
| 6,801,642 | B2 * | 10/2004 | Gorday et al. | 382/118 |
| 7,620,404 | B2 * | 11/2009 | Chesnais et al. | 455/456.1 |
| 7,929,710 | B2 * | 4/2011 | Iriyama | 381/58 |
| 2005/0080849 | A1 * | 4/2005 | Wee et al. | 709/204 |
| 2005/0273325 | A1 * | 12/2005 | Frey et al. | 704/226 |
| 2007/0030824 | A1 * | 2/2007 | Ribaudo et al. | 370/328 |
| 2008/0037837 | A1 * | 2/2008 | Noguchi et al. | 382/118 |
| 2008/0167106 | A1 * | 7/2008 | Lutnick et al. | 463/16 |
| 2008/0267416 | A1 * | 10/2008 | Goldstein et al. | 381/56 |
| 2008/0299948 | A1 * | 12/2008 | Rosener | 455/412.2 |

FOREIGN PATENT DOCUMENTS

CN 1972186 A 5/2007

OTHER PUBLICATIONS

Office Action Received for Chinese Patent Application No. 201010221279.8, mailed on Oct. 10, 2012, 8 pages of Office Action and 12 pages of English Translation.
Raffa, Giuseppe et al., "Context-Rich Communication Between a Device and a Vehicle", U.S. Appl. No. 13/763,261, filed Feb. 8, 2013, 57 pages.
Choudhury et al., "Characterizing Social Networks using the Sociometer", NAACOS 2004, 4 pages.
Eagle et al., "Social Network Computing", Citation Ubiquitous Computing, 2003, pp. 289-296.
Persson et al., "Nokia Sensor: From Research to Product", In Proceedings of the 2005 Conference on Designing for User Experience, 2005, pp. 2-22.
Schiele et al., "Beyond Position Awareness", Journal Personal and Ubiquitous Computing archive, vol. 6, Issue 5-6, Dec. 2002, 6 pages.
Office Action received for Chinese Patent Application No. 201010221279.8, mailed on Jun. 20, 2013, 11 pages of English Translation and 7 pages of Office Action.

* cited by examiner

*Primary Examiner* — Yasin Barqadle
(74) *Attorney, Agent, or Firm* — Caven & Aghevli LLC

(57) ABSTRACT

Systems and methods for proximity detection between electronic devices are disclosed. One or more electronic devices transmit signals to a proximity server, which determines whether the first electronic device may be proximate the second electronic device. The proximity server transmits a signal to the first electronic device and the second device, and in response to the signal, the first and second electronic devices activate an environmental sensor, collect at least one sample of environmental data, extract at least one feature set of the environmental data, generate a first obscured feature from the feature set, transmit the first and second obscured feature sets to the proximity server. The proximity server uses the first obscured feature set and the second obscured feature set to determine whether the first electronic device and the second electronic device are proximate.

28 Claims, 5 Drawing Sheets

MULTIMODAL PROXIMITY DETECTION

RELATED APPLICATIONS

None.

BACKGROUND

Technology that understands the set of people that with whom a user interacts over time has applications in context aware computing systems. For example, such technology can help a user understand and review how much time he/she spent with different people over time and as a consequence help the person in improving his/her social life. Alternatively, it can help identify a set of people who are currently involved in an activity together which provides group context for the context aware system. For example, ambient displays or kiosks can automatically adapt to the group context instead of relying on individuals' context. Thus, systems and methods for proximity detection may find utility.

BRIEF DESCRIPTION OF THE DRAWINGS

The detailed description is described with reference to the accompanying figures.

DETAILED DESCRIPTION

Described herein are exemplary systems and methods to implement a power efficient proximity detection service in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
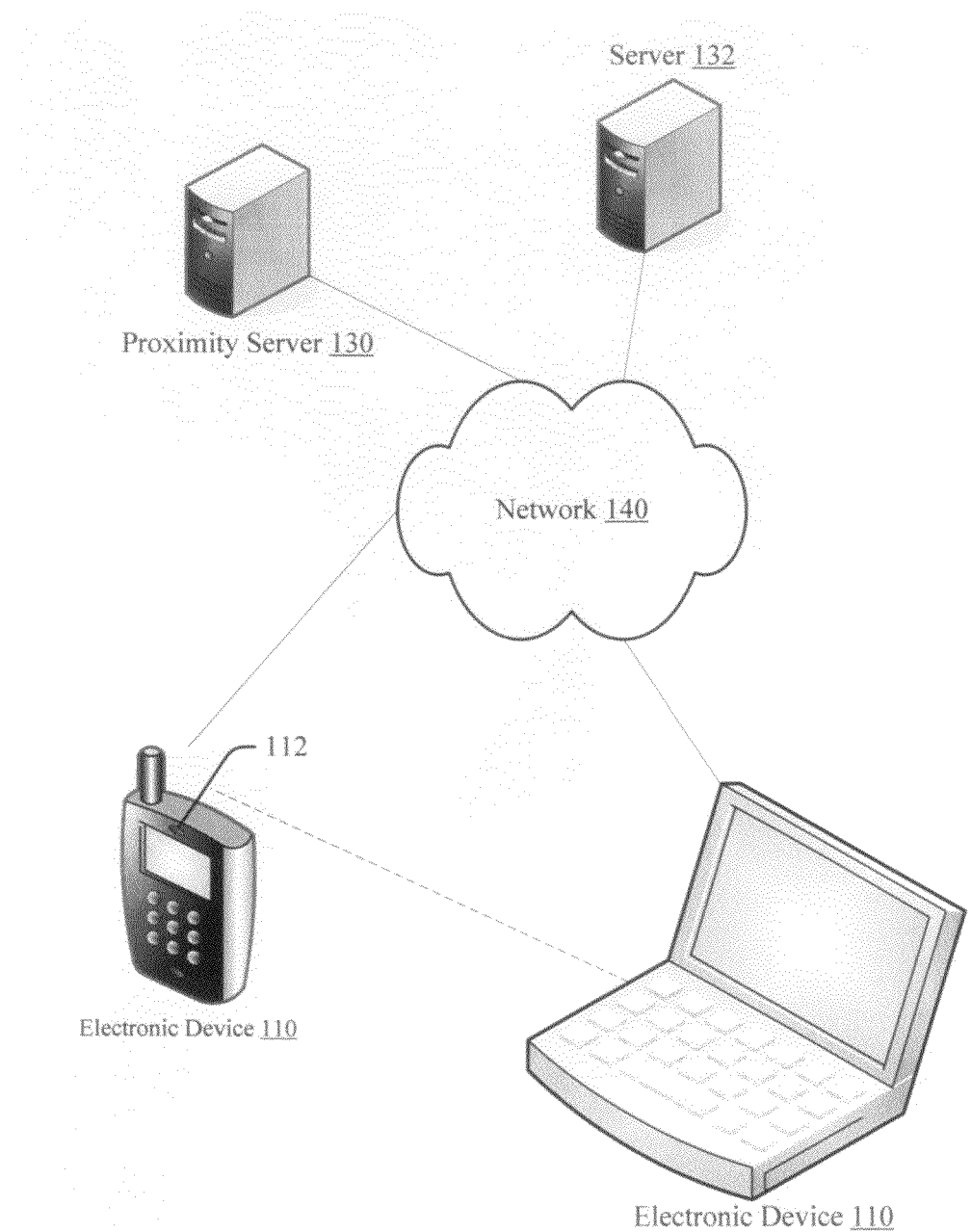
FIG. 1 is a schematic illustration of a network environment in which multimodal proximity detection may be implemented according to some embodiments.

FIG. 1 is a schematic illustration of a network environment in which multimodal proximity detection may be implemented according to some embodiments. Referring to FIG. 1, one or more electronic devices 110 may be coupled to one or more resources provided by a server 132 via a network 140. In some embodiments electronic device 110 may be embodied as a mobile telephone, PDA, laptop computer or other mobile computing device as described with reference to electronic device 110. Network 140 may be embodied as a public communication network such as, e.g., the internet, or as a private communication network such as, e.g., a local area network (LAN), a wide area network (WAN), a personal area network (PAN) or combinations thereof. Further, network 140 may be a wired network, a wireless network, or combinations thereof. Electronic device(s) 110 are further coupled to a proximity server 130 through network 140. Servers 130, 132 may be embodied as computer systems.

Figure 2:
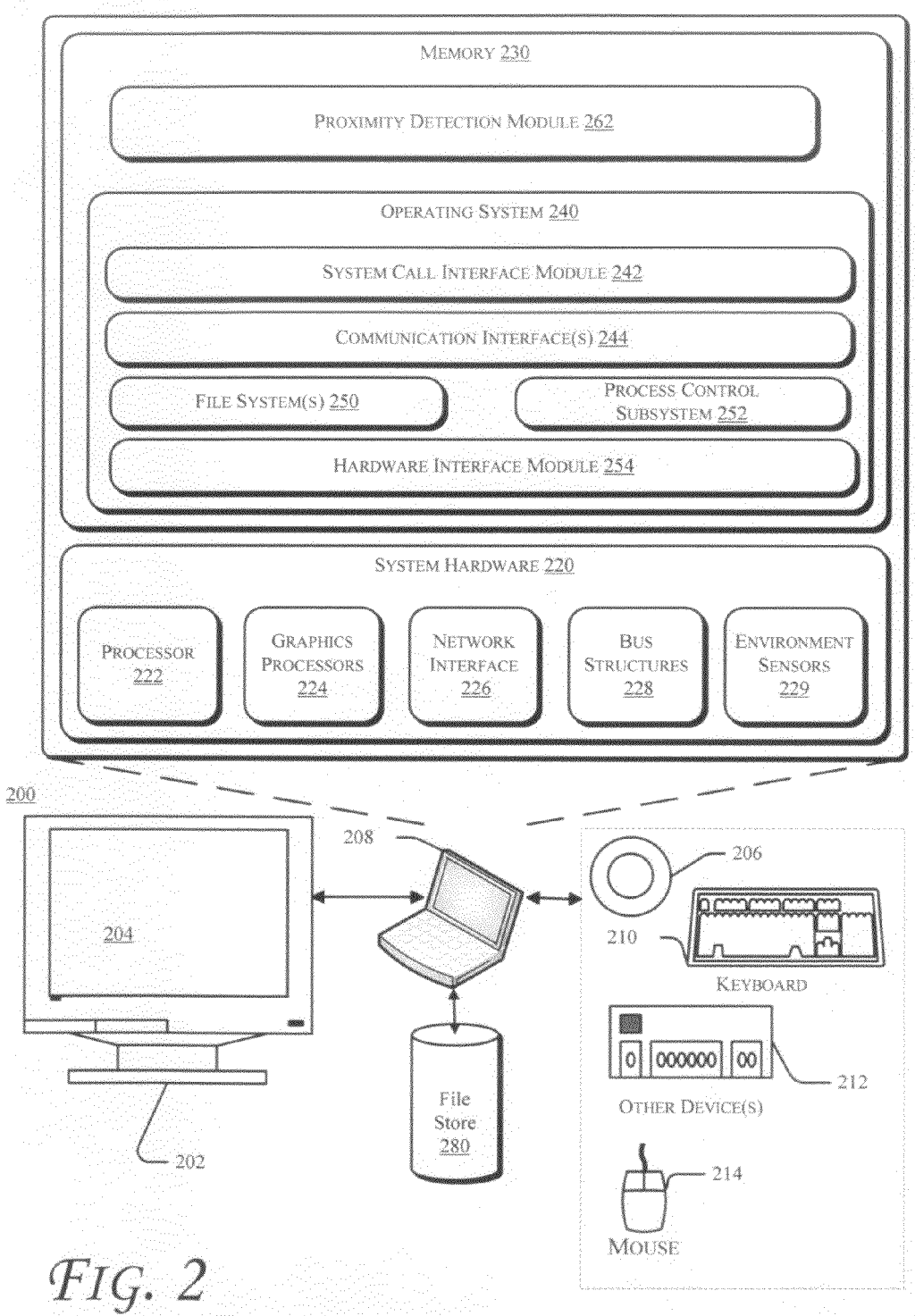
FIG. 2 is a schematic illustration of an exemplary electronic device which may be adapted to implement a power efficient proximity detection service in accordance with some embodiments.

FIG. 2 is a schematic illustration of an exemplary electronic device 210 which may be adapted to implement multimodal proximity detection in accordance with some embodiments. In one embodiment, system 200 includes a computing device 208 and may include one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 208 includes system hardware 220 and memory 230, which may be implemented as random access memory and/or read-only memory. A file store 280 may be communicatively coupled to computing device 208. File store 280 may be internal to computing device 208 such as, e.g., one or more hard drives, CD-ROM drives, DVD-ROM drives, or other types of storage devices. File store 280 may also be external to computing device 208 such as, e.g., one or more external hard drives, network attached storage, or a separate storage network.

System hardware 220 may include one or more processors 222, at least one graphics processor 224, network interfaces 226, bus structures 228, and sensors 229. In one embodiment, processor 222 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 224 may function as adjunct processors that manage graphics and/or video operations. Graphics processors 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Sensors 229 may be embodied as short range radios such as Bluetooth, IEEE 802.15.4 etc. to determine devices within a short distance (typically around 10 meters or so), location information monitors (available from GPS, WiFi access points etc.) to determine devices that are in roughly the same location, detectors which determine change in location information (available from GPS, WiFi or using accelerometers to detect motion) so as to determine the sets of devices that have remained in proximity during the course of the motion, sensors which use audio information to determine devices that are in audio range, or vision information to determine similar visual information and/or light levels, or with face detection capabilities.

Memory 230 may include an operating system 240 for managing operations of computing device 208. In one embodiment, operating system 240 includes a hardware interface module 254 that provides an interface to system hardware 120. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a UNIX operating system or any derivative thereof (e.g., Linux, Solaris, etc.) or as a Windows® brand operating system, or other operating systems.

In various embodiments, the computing device 208 may be embodied as a personal computer, a laptop computer, a personal digital assistant, a mobile telephone, an entertainment device, or another computing device.

In one embodiment, memory 230 includes a proximity detection module 262 in computing system 200. In one embodiment, proximity detection module 262 may include logic instructions encoded in a computer-readable medium which, when executed by processor 222, cause the processor 222 to implement operations to implement multimodal proximity detection.

Proximity server 130 may be embodied as a conventional computer server, and may have a structure similar to the structure depicted in FIG. 2. In embodiments, proximity server 130 may also comprise a proximity detection module 262 which cooperates with the proximity detection module in electronic device(s) 110 to implement multimodal proximity detection. Aspects of this cooperation are explained with reference to FIGS. 3 and 4.

Figure 3:
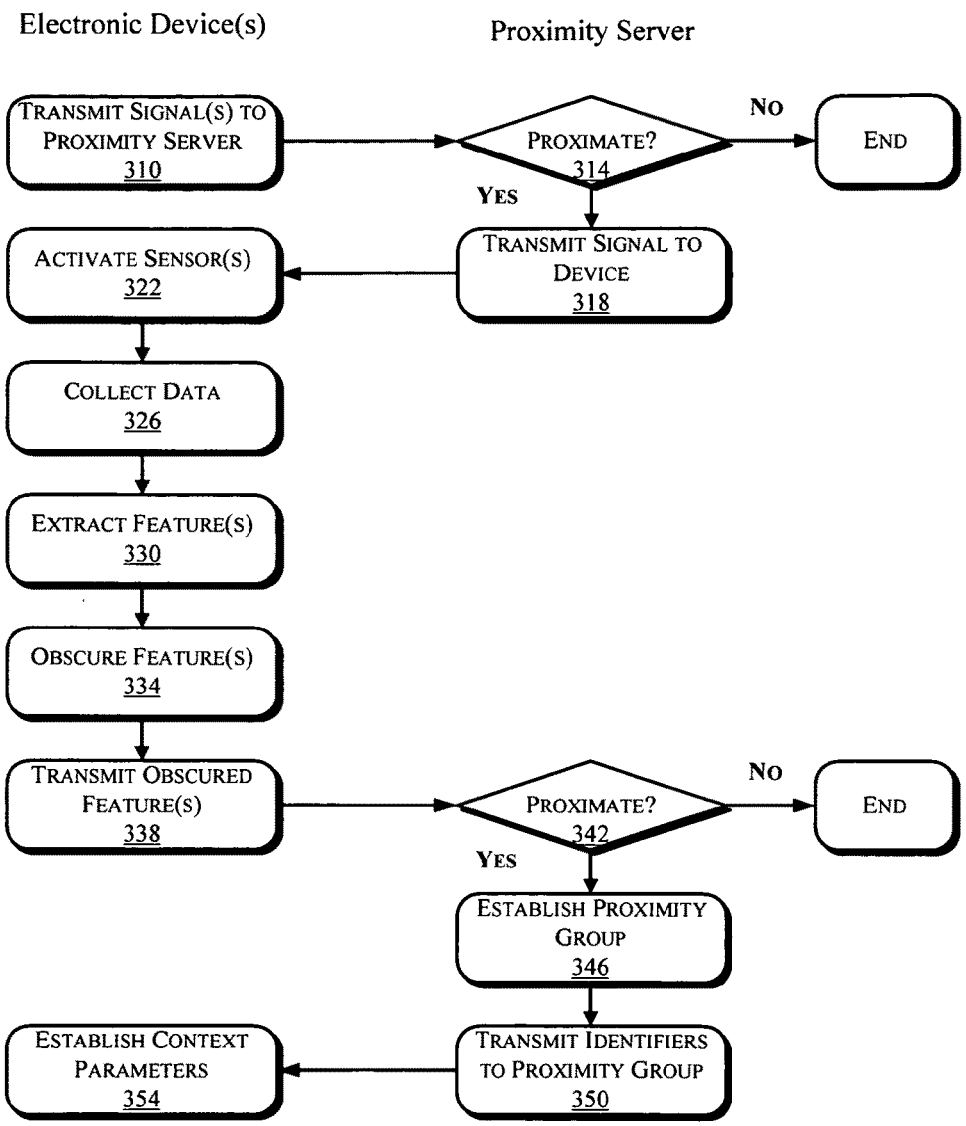
FIG. 3 is a flowchart illustrating operations in a method to implement a power efficient proximity detection service in an electronic device, in accordance with some embodiments.

FIG. 3 is a flowchart illustrating operations in a method to implement a power efficient proximity detection service in an electronic device, in accordance with some embodiments. In some embodiments, the operations depicted in FIG. 3 may be implemented by the respective proximity detection modules 162 in the electronic device 110 and the proximity server 130. Although the flowchart depicted in FIG. 3 illustrates the interaction between a single electronic device and the proximity server, one skilled in the art will recognize that multiple electronic devices may communicate with proximity server 130.

Referring to FIG. 3, at operation 310 an electronic device 110 transmits one or more signals to the proximity server. By way of example, an electronic device may transmit voice, data signals, or pilot signals via the network 140. Proximity server 130 may receive a portion of the signals transmitted by the electronic device. For example, the proximity server 130 may "sniff" signals transmitted across the network 140. Alternatively, the proximity server 130 may receive signals from another network node coupled to the electronic device. At operation 318 and the proximity server 130 transmits a signal to the electronic devices.

In response to receiving the signal from the proximity server, the electronic device(s) implement an environmental data sampling routine, which uses one or more sensors to sample environmental data in the region proximate the electronic device. Thus, at operation 326 environmental data is collected. In one embodiment, the electronic devices use microphones to sample audio signals from the environment. The sampling may be synchronized such that devices which the proximity server determined, at operation 314, may be proximate initiate an audio sampling at the same time. The samples are captures, and may be time-stamped before they are sent to the proximity server.

At operation 330 one or more features are extracted from the data sampled in operation 326. For example, in an embodiment in which the electronic devices gather audio data, the electronic device(s) may extract Mel-frequency cepstral coefficients (MFCC) from the raw audio data. More generally, other features which preserve the spectral and temporal information in the data stream may be used. For example, possible features include fast Fourier transform, discrete cosine transform, discrete wavelet transform, and cepstrum transform.

At operation 334 the one or more features gathered in operation 330 are obscured in order to protect the privacy of the user. Hence a second step is needed to obscure the features such that it would be difficult for a machine to extract relevant information. By selectively mixing and/or dropping features the features can be obscured without compromising similarity measure significantly. A time-dependent mixing/dropping pattern may be used to prevent machine learning algorithms from adapting to this degraded feature set.

In one embodiment calculated a similarity measure based on Mel-frequency cepstral coefficients (MFCC) may be calculated every 10 seconds between electronic devices which may be proximate. Each of the 10 second windows may be broken down into 16 millisecond non-overlapping frames. Twelve 12 MFCC coefficients may be computed for each frame, producing 625×12 coefficients over the 10 second window. The notation f(n,k) is used to denote the kth (k ranging between 1 to K=12) MFCC bin in the nth (n ranging between 1 to N=625) frame of the window. The kth MFCC bin of one device may be cross-correlated with the kth MFCC bin of another across the N frames. K such correlation functions are computed and summed together to arrive at a composite correlation. A high maximum value in the composite correlation indicates the two devices are in close audio proximity. Although the maximum value in the correlation can be used as the similarity measure in this observation window, other factors such as slope around the peak and peak to average ratio may be incorporated as an enhancement. A cross-correlation over N frames can absorb any small time-synchronization errors between the different devices. One skilled in the art will recognize that the window size may be greater than or less than 10 seconds. The length of the typical environmental sound (speech utterance) and the amount of time synchronization errors between devices are useful in determining the window size.

For each of the MFCC bin, one of three (L) choices may be used in the computation of the correlations: 1) the raw MFCC $T^{(1)}$ [f(n,k)]=f(n,k), 2) the difference between current and next frame (on the same bin) $T^{(2)}$ [f(n,k)]=f(n,k)−f(n+1,k), and 3) the sum of current and next frame $T^{(3)}$ [f(n,k)]=f(n,k)+f(n+1,k). For example, in the span of one 10-second window, the obscuring function on the 12 MFCC bins could be $\{T^{(2)}\ T^{(1)}\ T^{(3)}\ T^{(2)}\ T^{(1)}\ T^{(3)}\ T^{(1)}\ T^{(2)}\ T^{(2)}\ T^{(3)}\ T^{(3)}\ T^{(1)}\}$. In another 10-second window the permutation could be something different $\{T^{(1)}\ T^{(1)}\ T^{(3)}\ T^{(3)}\ T^{(2)}\ T^{(3)}\ T^{(2)}\ T^{(3)}\ T^{(1)}\ T^{(2)}\ T^{(2)}\ T^{(3)}\}$. The obscuring function should be held constant across the 10 second observation window and across different devices for that same epoch. In this example, there are $L^K = 3^{12} = 531441$ permutations of mixing, making the job of inference difficult if not impossible. The number of permutations can be varied by changing the number of features (K) and the number of mixing functions (L).

In another embodiment frames in the 10 second observation window may be dropped (i.e., all devices drop the same randomly selected frames). This process also preserves the similarity relationships between sampled data. The concepts of feature extraction and obscuring can easily be extended to image, video or other modalities.

At operation 338 the obscured feature set generated at operation 334 is transmitted from the electronic device(s) to the proximity server. The proximity server analyzes the feature sets to determine whether the environmental data indicates that the devices are proximate (operation 342). As described above, in one embodiment the obscured MFCC data may be cross-correlated to determine whether the data from different devices appears to reflect microphone pickups from the same ambient environment. If the data does not correlate, then the proximity server concludes that the devices are not proximate and the process ends. By contrast, if the data correlates, then the proximity server concludes that the devices are proximate, and control passes to operation 346.

At operation 346 the proximity server establishes a proximity group for the devices. In one embodiment the proximity group may be implemented as a logical association between the devices stored in a computer-readable memory coupled to the proximity server. For example, the proximity group may be stored as a record in a database or a flat file.

At operation 350 the proximity server transmits identifiers associated with the electronic devices in the proximity group to the devices in the proximity group. In this regard, user privacy becomes an issue. Hence, mechanisms to prevent a person from identifying a set of strangers around them, unless the strangers wish to broadcast their presence.

In one technique, the proximity server returns only the device IDs of the devices that are in proximity to an electronic device. These device IDs can be chosen so that the identity of their owners is not revealed (e.g., MAC IDs of Bluetooth/WLAN devices). Mapping the device ID to its owner may be performed by the receiving mobile device, and the mapping would only be possible if the person had this mapping information stored. Hence if two people were friends and wanted their proximity information to be shared with each other, they would exchange their device ID—identity mapping with each other.

Alternatively, symmetric and/or asymmetric encryption mechanisms can be used to guarantee user privacy. For example, a pair of public/private keys can be generated by each user and the public key is distributed to trusted users exploiting the user's social network and user settings. The device ID is then encrypted using the sender's private key. Only trusted users that have previously obtained the sender's public key can obtain the device ID for subsequent mapping with person identity.

In another embodiment, a person's list of contacts or social network or in general the set of people with whom proximity information is to be shared. For example, the electronic device may maintain a "proximity allowed list" which is provided to the server. Alternatively, the proximity allowed list can be maintained on the server itself with relevant preferences. Based on the proximity calculations, information about the proximity of a device is only sent to the other device if the two devices have each other in their proximity allowed list or if their privacy settings allow friends of friends (up to a certain number of hops away) to be see them. Otherwise, no information about the other device is sent. In this way, even a person's device ID is not revealed unless the two persons have a trusted relationship.

Once in possession of the identifiers of other electronic devices proximate to an electronic device, this information may be used to establish context-sensitive parameters. In some embodiments, an electronic device may maintain a list of operating contexts that can be invoked when other electronic devices are detected. By way of example, a user who attends regular meetings with a specified group of users may configure the electronic device to open particular applications or to connect to specific network resources when a threshold number of members of the group are detected to be proximate to the user.

Since the sensor data capture and processing described above will result in a non-trivial energy consumption on the electronic device, especially if it is done continuously, multi-modal sensing may be leveraged to reduce the total energy consumption of the device. For example, low power consumption devices such as accelerometers can be used to detect the motion of people and devices, and they are typically sampled at 100 Hz or less (compared to 8 KHz sampling of audio) and require less processing than audio. So once the devices have captured the audio, performed the required processing and determined the proximity information, it is safe to assume that this situation will remain in effect as long as the devices are not moved from their position, or that no other devices have joined the group.

Thus, the electronic device may include a trigger sensor, which is responsible for sampling some aspect of the device and/or environment and detecting any change that would require retriggering the proximity detection process. Sampling the trigger sensor is more power efficient than continuously running the proximity detection routine.

Figure 4:
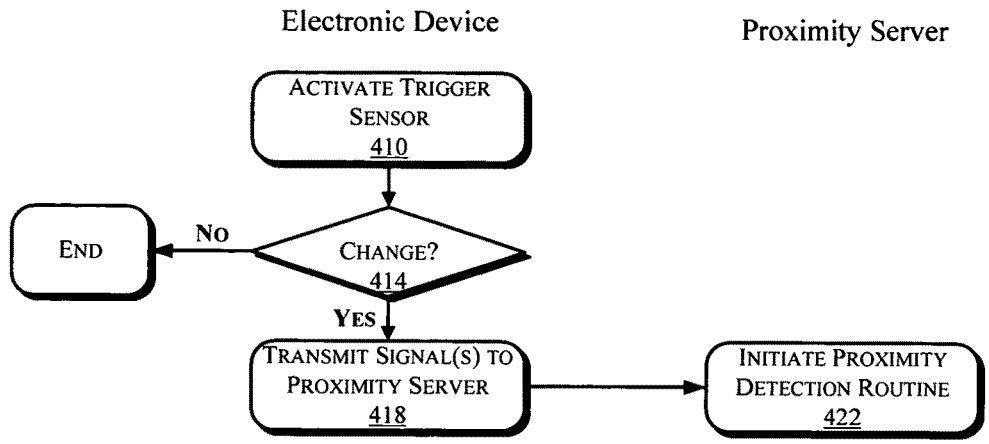
FIG. 4 is a flowchart illustrating operations in a method to implement a power efficient proximity detection service in an electronic device, in accordance with some embodiments.

FIG. 4 is a flowchart illustrating operations in a method to implement a power efficient proximity detection service in an electronic device, in accordance with some embodiments. Referring to FIG. 4, at operation 410 the electronic device activates a trigger sensor. At operation 414 the trigger sensor determines whether there has been a change in the environment, e.g., whether the electronic device has moved. If the device has not moved, then the routine ends. By contrast, if the device has moved then control passes to operation 418 and the electronic device transmits one or more signals to the proximity detector indicating that there has been a change in the environment. In response, at operation 422, the proximity server initiates a proximity detection routine, as described with reference to FIG. 3. In some embodiments the proximity detection routine is initiated in only the electronic device which transmitted the signal to the proximity server. In other embodiments, the proximity server transmits a signal to one or more additional electronic devices which are in a proximity group with the electronic device which transmitted the signal to the proximity server.

Figure 5:
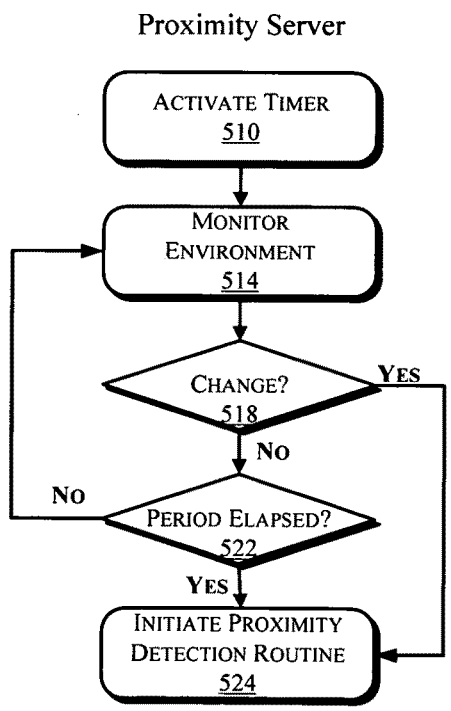
FIG. 5 is a flowchart illustrating operations in a method to implement a power efficient proximity detection service in an electronic device, in accordance with some embodiments.

In another aspect, in some embodiments the proximity server implements a proximity detection routine in electronic devices on a periodic basis, or in response to a change in the environment as detected in FIG. 4. FIG. 5 is a flowchart illustrating operations in a method to implement a power efficient proximity detection service in an electronic device, in accordance with some embodiments. In some embodiments, the operations of FIG. 5 may be implemented on by the proximity detection module 162 on the proximity server on one or more proximity groups managed by the proximity server. Referring to FIG. 5, at operation 510 the proximity server activates a timer which establishes a duration between periodic proximity detection routines. At 514 the proximity server monitors the environment of a proximity group, e.g., by waiting for signals from an electronic device indicating that the environment has changed, as described with reference to FIG. 4.

If, at operation 518, the proximity server receives a signal from an electronic device indicating that the environment has changed, then control passes to operation 524 and the proximity server initiates a proximity detection routine, as described with reference to FIG. 3. In some embodiments the proximity detection routine is initiated in only the electronic device which transmitted the signal to the proximity server. In other embodiments the proximity server transmits a signal to one or more additional electronic devices which are in a proximity group with the electronic device which transmitted the signal to the proximity server.

By contrast, if at operation 518 there is no change in the environment control passes to operation 522 and the proximity server determines whether the period has elapsed. If the period has not elapsed, then control passes back to operation 514 and the proximity server continues to monitor the environment. By contrast, if there period has elapsed, then control passes to operation 524 and the proximity server initiates a proximity detection routine, as described with reference to FIG. 3.

In some embodiments the proximity server implements a confidence level (CL) in the sensor(s) on the electronic device being able to detect the change in proximity. Thus, if the sensor(s) detected no change in activity, then the proximity server is confident to CL extent that the results of the last proximity analysis are still valid. This confidence level may be useful in selecting the periodicity of the proximity detection algorithm used in operation 522. The higher CL is, the longer this period can be. As described above, two exemplary triggers sensors are accelerometers and location sensors. If the accelerometer records little or no motion, then the proximity server presumes that the device hasn't been moved from its current location, and as a result, the proximity server attaches a high confidence level in this trigger sensor. The location sensor (e.g. GPS, radio) can also be used as a trigger sensor, however, the confidence level in this sensor will depend on the localization resolution of this sensor; the higher the resolution, the higher the confidence level.

Figure 6:
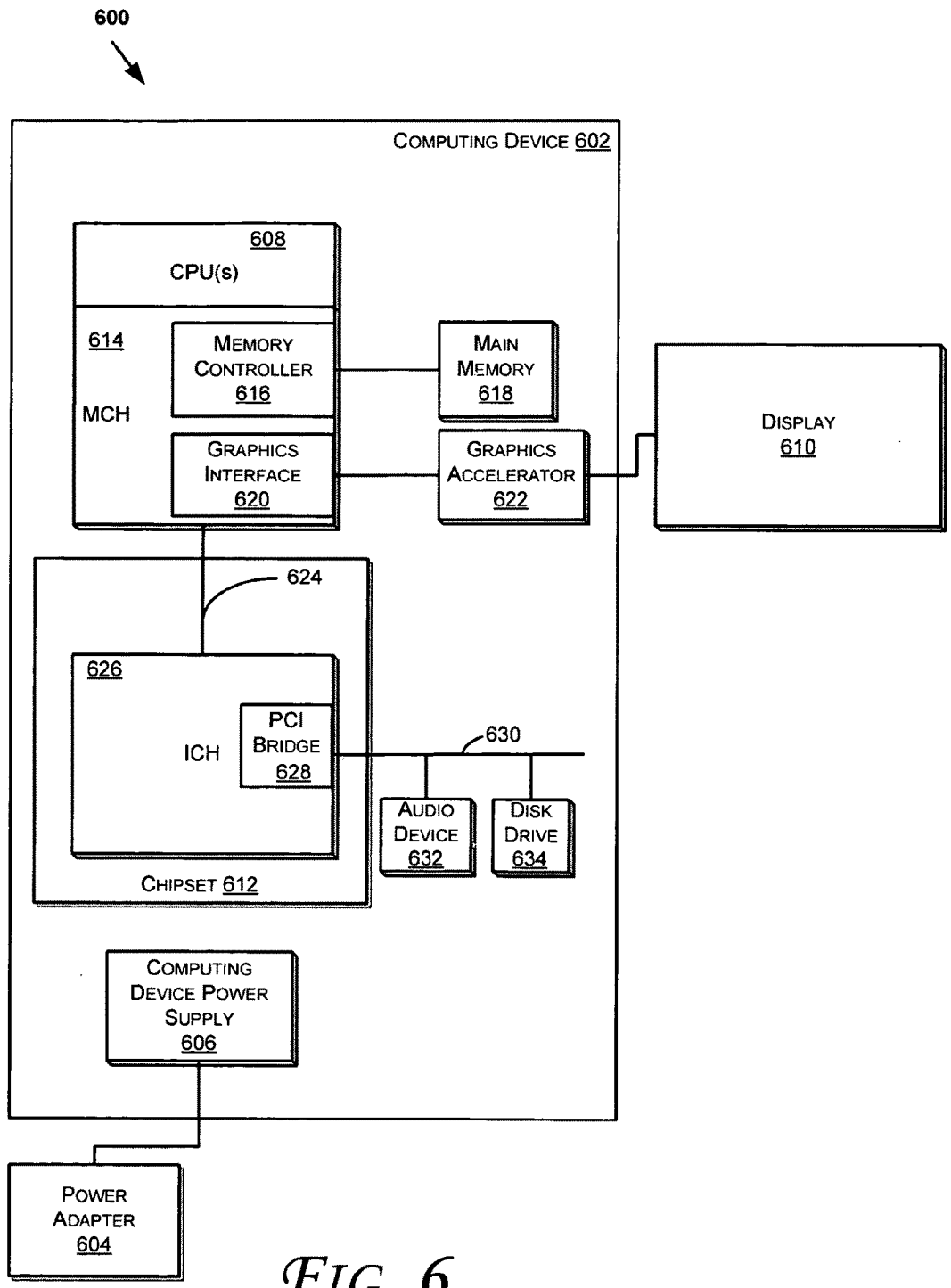
FIG. 6 is a diagram illustrating interactions between various elements of a system to implement a power efficient proximity detection service in an electronic device, in accordance with some embodiments.

FIG. 6 is a schematic illustration of components of an exemplary electronic device 600 adapted to implement a power efficient proximity detection service in accordance with some embodiments. In the embodiment depicted in FIG. 6, the electronic device 600 includes a computing device 602 and a power adapter 604 (e.g., to supply electrical power to the computing device 202). The computing device 2602 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 602 (e.g., through a computing device power supply 606) from one or more of the following sources: one or more battery packs, an alternating current (AC) outlet (e.g., through a transformer and/or adaptor such as a power adapter 604), automotive power supplies, airplane power supplies, and the like. In some embodiments, the power adapter 604 may transform the power supply source output (e.g., the AC outlet voltage of about 110 VAC to 240 VAC) to a direct current (DC) voltage ranging between about 7 VDC to 12.6 VDC. Accordingly, the power adapter 604 may be an AC/DC adapter.

The computing device 602 may also include one or more central processing unit(s) (CPUs) 608. In some embodiments, the CPU 408 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 612 may be coupled to, or integrated with, CPU 608. The chipset may include a memory control hub (MCH) 614. The MCH 614 may include a memory controller 616 that is coupled to a main system memory 618. The main system memory 618 stores data and sequences of instructions that are executed by the CPU 608, or any other device included in the system 600. In some embodiments, the main system memory 618 includes random access memory (RAM); however, the main system memory 618 may be implemented using other memory types such as dynamic RAM (DRAM), synchronous DRAM (SDRAM), and the like. Additional devices may also be coupled to the bus 610, such as multiple CPUs and/or multiple system memories.

The MCH 614 may also include a graphics interface 620 coupled to a graphics accelerator 622. In some embodiments, the graphics interface 620 is coupled to the graphics accelerator 622 via an accelerated graphics port (AGP). In some embodiments, a display (such as a flat panel display) 640 may be coupled to the graphics interface 620 through, for example, a signal converter that translates a digital representation of an image stored in a storage device such as video memory or system memory into display signals that are interpreted and displayed by the display. The display 640 signals produced by the display device may pass through various control devices before being interpreted by and subsequently displayed on the display.

An interface 624 couples the MCH 614 to an integrated control hub (ICH) 626. The ICH 626 provides an interface to input/output (I/O) devices coupled to the electronic device 600. The ICH 626 may be coupled to a peripheral component interconnect (PCI) bus. Hence, the ICH 626 includes a PCI bridge 628 that provides an interface to a PCI bus 630. The PCI bridge 628 provides a data path between the CPU 608 and peripheral devices. Additionally, other types of I/O interconnect topologies may be utilized such as the PCI Express™ architecture, available through Intel® Corporation of Santa Clara, Calif.

The PCI bus 630 may be coupled to an audio device 632 and one or more disk drive(s) 634. Other devices may be coupled to the PCI bus 630. In alternate embodiments, the CPU 608 and the MCH 614 may be combined to form a single chip. Furthermore, the graphics accelerator 622 may be included within the MCH 614 in other embodiments.

Additionally, other peripherals coupled to the ICH 626 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 602 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to implement multimodal proximity detection in a first electronic device, comprising:
    initiating an environmental sampling routine in the first electronic device by:
        activating an environmental sensor;
        collecting at least one sample of environmental data;
        extracting at least one feature set of the environmental data;
        generating a first obscured feature set from the feature set extracted from the first electronic device, wherein the first obscured feature set comprises a manipulated set of Mel-frequency cepstral coefficients extracted from the environmental data with portions of the feature set selective removed;
        transmitting the first obscured feature set from the first electronic device to a proximity server; and
        receiving, in the first electronic device, a signal indicating whether the first electronic device is proximate to a second electronic device;
    receiving, in the first electronic device, an identifier associated with the second electronic device if the device was proximate; and,
establishing at least one context parameter based on the identifier when the device is proximate,
    wherein, in response to a proximity signal indicating that the first electronic device is proximate the second electronic device, the first electronic device:
        activates a trigger sensor to detect whether the first electronic device has moved;
        in response to a determination that the first electronic device has moved, transmits a movement signal to the proximity server, wherein the movement signal causes the proximity server to transmit an environmental sampling signal to the first electronic device and the second electronic device to repeat the environmental sampling routine.

2. The method of claim 1, wherein, in response to a signal from the proximity server, the first electronic device activates a microphone to collect samples of ambient noise from the surrounding environment.

3. The method of claim 2, wherein:
    the first electronic device applies an obscuring function to the samples of ambient noise collected from the surrounding environment, wherein the obscuring function selectively removes portions of the feature set.

4. The method of claim 1, wherein, in response to a determination in the proximity server that the first electronic device and the second electronic device are proximate:
    the proximity server determines whether the first electronic device and the second electronic device allow each other to know of their proximity, and in response to a determination that the first electronic device and the second electronic device allow each other to know of their proximity:
        the proximity server defines a proximity group comprising the first electronic device and the second electronic device; and the proximity server transmits an identifier associated with the first electronic device to the second electronic device and an identifier associated with the second electronic device to the first electronic device.

5. The method of claim 1, wherein the proximity server triggers a proximity detection routine on a periodic basis.

6. The method of claim 1, wherein, the trigger sensor comprises at least one of an accelerometer or a location sensor.

7. An electronic device, comprising:
a processor; and
logic to:
  receive a first signal indicating that the electronic device may be proximate a second electronic device;
  in response to the signal, to initiate an environmental sampling routine in the first electronic device by:
    activating an environmental sensor;
    collecting at least one sample of environmental data;
    extracting at least one feature set of the environmental data;
    generating a first obscured feature set from the feature set extracted from the first electronic device, wherein the first obscured feature set comprises a manipulated set of Mel-frequency cepstral coefficients extracted from the environmental data with portions of the feature set selective removed;
    transmitting the first obscured feature set from the first electronic device to a proximity server; and
  receive, in the first electronic device, a signal indicating whether the first electronic device is proximate to a second electronic device;
  receive, in the first electronic device, an identifier associated with the second electronic device if the device was proximate; and,
establish at least one context parameter based on the identifier when the device is proximate
  wherein, in response to a proximity signal indicating that the first electronic device is proximate the second electronic device, the first electronic device:
    activates a trigger sensor to detect whether the first electronic device has moved;
      in response to a determination that the first electronic device has moved, transmits a movement signal to the proximity server, wherein the movement signal causes the proximity server to transmit an environmental sampling signal to the first electronic device and the second electronic device to repeat the environmental sampling routine.

8. The electronic device of claim 7, wherein, in response to a signal from the proximity server, the electronic device activates a microphone to collect samples of ambient noise from the surrounding environment.

9. The electronic device of claim 8, wherein:
the electronic device applies an obscuring function to the samples of ambient noise collected from the surrounding environment, wherein the obscuring function selectively removes portions of the feature set.

10. The electronic device of claim 7, wherein, in response to a determination in the proximity server that the electronic device and the second electronic device are proximate:
the proximity server determines whether the first electronic device and the second electronic device allow each other to know of their proximity, and in response to a determination that the first electronic device and the second electronic device allow each other to know of their proximity:

the proximity server defines a proximity group comprising the first electronic device and the second electronic device; and
the proximity server transmits an identifier associated with the first electronic device to the second electronic device and an identifier associated with the second electronic device to the first electronic device.

11. The electronic device of claim 7 wherein the proximity server triggers a proximity detection routine on a periodic basis.

12. The electronic device of claim 7, wherein, the trigger sensor comprises at least one of an accelerometer or a location sensor.

13. A method to implement multimodal proximity detection in a proximity server, comprising:
receiving signals from a first electronic device and a second electronic device;
determining whether a first electronic device may be proximate a second electronic device;
in response to the determination that the first electronic device may be proximate the second electronic device, transmitting a signal from the proximity server to the first electronic device and the second device;
receiving a first obscured feature set from the first electronic device and a second obscured feature set from the second electronic device, wherein the first obscured feature set and the second obscured feature set each comprise a manipulated set of Mel-frequency cepstral coefficients extracted from the environmental data, with corresponding portions of the feature sets selective removed;
using the first obscured feature set and the second obscured feature set to determine whether the first electronic device and the second electronic device are proximate
receiving a movement signal indicating that the first electronic device has moved, and in response to the movement signal, transmitting an environmental sampling signal to the first electronic device and the second electronic device to repeat an environmental sampling routine.

14. The method of claim 13, wherein:
the first electronic device and the second electronic device transmit location information to the proximity server; and
the proximity server uses the location information to determine whether the first electronic device and the second electronic device may be proximate.

15. The method of claim 14, wherein the proximity server:
determines location information from the signals transmitted by the first electronic device and the second electronic device; and
the proximity server uses the location information to determine whether the first electronic device and the second electronic device may be proximate.

16. The method of claim 13, wherein:
at least one of the first electronic device and the second electronic device transmit a list of devices detected by a sensor to the proximity server; and
the proximity server uses the list of devices to determine whether the first electronic device and the second electronic device may be proximate.

17. The method of claim 13, wherein, in response to a determination in the proximity server that the first electronic device and the second electronic device are proximate:
the proximity server determines whether the first electronic device and the second electronic device allow each other to know of their proximity, and in response to a determination that the first electronic device and the second electronic device allow each other to know of their proximity:

the proximity server defines a proximity group comprising the first electronic device and the second electronic device; and the proximity server transmits an identifier associated with the first electronic device to the second electronic device and an identifier associated with the second electronic device to the first electronic device.

18. The method of claim 17, wherein the proximity server triggers a proximity detection routine on a periodic basis.

19. The method of claim 18, wherein, the trigger sensor comprises at least one of an accelerometer or a location sensor.

20. The method of claim 18, wherein the proximity server establishes a time period between environmental sampling routines by electronic devices.

21. A proximity server, comprising:
a processor; and
logic to:
receive signals from a first electronic device and a second electronic device;
determine whether a first electronic device may be proximate a second electronic device;
in response to the a determination that the first electronic device may be proximate the second electronic device, transmit a signal from the proximity server to the first electronic device and the second device;
receive a first obscured feature set from the first electronic device and a second obscured feature set from the second electronic device, wherein the first obscured feature set and the second obscured feature set each comprise a manipulated set of Mel-frequency cepstral coefficients extracted from the environmental data, with corresponding portions of the feature sets selective removed; and
use the first obscured feature set and the second obscured feature set to determine whether the first electronic device and the second electronic device are proximate
receive a movement signal indicating that the first electronic device has moved, and in response to the movement signal, transmitting an environmental sampling signal to the first electronic device and the second electronic device to repeat an environmental sampling routine.

22. The proximity server of claim 21, wherein:
the first electronic device and the second electronic device transmit location information to the proximity server; and
the proximity server uses the location information to determine whether the first electronic device and the second electronic device may be proximate.

23. The proximity server of claim 21, wherein the proximity server further comprises logic to:
determine location information from the signals transmitted by the first electronic device and the second electronic device; and
use the location information to determine whether the first electronic device and the second electronic device may be proximate.

24. The proximity server of claim 21, wherein:
at least one of the first electronic device and the second electronic device transmit a list of devices detected by a sensor to the proximity server; and
the proximity server uses the list of devices to determine whether the first electronic device and the second electronic device may be proximate.

25. The proximity server of claim 21, wherein, in response to a determination in the proximity server that the first electronic device and the second electronic device are proximate:
the proximity server determines whether the first electronic device and the second electronic device allow each other to know of their proximity, and in response to a determination that the first electronic device and the second electronic device allow each other to know of their proximity:
the proximity server defines a proximity group comprising the first electronic device and the second electronic device; and
the proximity server transmits an identifier associated with the first electronic device to the second electronic device and an identifier associated with the second electronic device to the first electronic device.

26. The proximity server of claim 21, wherein the proximity server triggers a proximity detection routine on a periodic basis, in response to a signal.

27. The proximity server of claim 26, wherein, the trigger sensor comprises at least one of an accelerometer or a location sensor.

28. The proximity server of claim 26, wherein the proximity server establishes a time period between environmental sampling routines by electronic devices.

* * * * *

UNITED STATES PATENT AND TRADEMARK OFFICE
CERTIFICATE OF CORRECTION

PATENT NO. : 8,745,250 B2
APPLICATION NO. : 12/459296
DATED : June 3, 2014
INVENTOR(S) : Rahul C. Shah et al.

Page 1 of 1

It is certified that error appears in the above-identified patent and that said Letters Patent is hereby corrected as shown below:

On the Title page, in item (57), in column 2, in "Abstract", line 6, delete "second device," and insert -- second electronic device, --, therefor.

In the Claims:

In column 12, line 23, in claim 13, delete "second device;" and insert -- second electronic device; --, therefor.

In column 13, line 27, in claim 21, delete "the a" and insert -- the --, therefor.

In column 13, line 30, in claim 21, delete "second device;" and insert -- second electronic device; --, therefor.

Signed and Sealed this
Ninth Day of September, 2014

Michelle K. Lee
*Deputy Director of the United States Patent and Trademark Office*